United States Patent [19]
Choi

[11] Patent Number: 5,945,812
[45] Date of Patent: Aug. 31, 1999

[54] BATTERY CHARGING CIRCUIT FOR CHARGING A BATTERY IN ACCORDANCE WITH TEMPERATURE

[75] Inventor: Ki-Ryong Choi, Suwon, Rep. of Korea

[73] Assignee: Samsung Electronics Co., Ltd., Rep. of Korea

[21] Appl. No.: 09/006,672

[22] Filed: Jan. 13, 1998

[51] Int. Cl.[6] .................................................. H01M 10/46
[52] U.S. Cl. ............................................................ 320/150
[58] Field of Search .................................. 320/128, 132, 320/144, 150, 152, 153, FOR 134, FOR 138

[56] References Cited

U.S. PATENT DOCUMENTS

| | | | |
|---|---|---|---|
| 3,919,616 | 11/1975 | Allison . | |
| 4,424,476 | 1/1984 | Mullersman | 320/150 |
| 4,468,605 | 8/1984 | Fitzgerald et al. | 320/152 |
| 5,307,001 | 4/1994 | Heavey . | |
| 5,343,137 | 8/1994 | Kitaoka et al. | 320/132 |
| 5,708,351 | 1/1998 | Takamoro | 320/150 |

FOREIGN PATENT DOCUMENTS

| | | |
|---|---|---|
| 1500549 | 2/1978 | United Kingdom . |
| 2091643 | 5/1981 | United Kingdom . |
| 2085244 | 4/1982 | United Kingdom . |
| WO8303722 | 10/1983 | WIPO . |
| WO9216991 | 10/1992 | WIPO . |

OTHER PUBLICATIONS

International Search Report dated Mar. 31, 1998.

*Primary Examiner*—Edward H. Tso
*Attorney, Agent, or Firm*—Dilworth & Barrese

[57] ABSTRACT

A battery charging circuit including a power supply circuit for providing a rechargeable battery with a charge voltage. The circuit generates a reference voltage adaptive to a surrounding temperature, which is set corresponding to the full charge voltage of the rechargeable battery. The charge voltage of the rechargeable battery is compared with the reference voltage to generate a control signal. A switching device connects and disconnects the power supply circuit from the rechargeable battery in response to the control signal to adaptively control the full charge voltage according to variations of the surrounding temperature.

11 Claims, 2 Drawing Sheets

BATTERY CHARGING CIRCUIT FOR CHARGING A BATTERY IN ACCORDANCE WITH TEMPERATURE

BACKGROUND OF THE INVENTION

1. Field of the Invention

The present invention relates to battery charging and, more specifically, to a battery charging circuit for adaptively controlling the full charge voltage of a rechargeable battery in response to variations of the surrounding temperature.

2. Description of the Related Art

A battery charging circuit senses the full charge state of a rechargeable battery to prevent the battery from being damaged due to overcharging. There are several known techniques for sensing the full charge state of a rechargeable battery. One such technique continuously monitors the charge voltage of the rechargeable battery during the process of charging the battery. This known technique employs a complex circuit including, for example, an analog-to-digital (A/D) converter and a voltage comparator to detect the full charge point. A second known technique monitors temperature variations of the rechargeable battery to determine whether the battery is fully charged or not. Finally, a third known technique, a combination of the above first and second techniques, monitors the voltage and temperature variations of the rechargeable battery to detect the full charge state of the rechargeable battery.

Similarly, there are several known techniques for preventing the overcharging of a rechargeable battery. One such technique cuts off the charge voltage supplied to the rechargeable battery by using a voltage comparator and a mechanical or electronic switching element. A second known technique reduces the charge current instantaneously or gradually by using the voltage comparator and the mechanical or electronic switching element. A third known technique reduces an average charge current by detecting the charge voltage of the rechargeable battery and varying a pulse width of the charge current. Finally, a fourth known technique controls the charge current supplied to the battery through the use of a timer.

It is to be appreciated that the known techniques for detecting the full charge state of a rechargeable battery are so complex that the battery charging circuit needs to include a separate microprocessor. Obviously this is an uneconomical solution. Further, it is to be appreciated that the known techniques for preventing the overcharging of a rechargeable battery are disadvantageous in that the battery is discharged naturally with the lapse of time, after the battery has been fully charged. Accordingly, it would be desirable and highly advantageous for the above known techniques to include additional elements for reducing the charge current step by step, and also for reducing the charge current even in a standby state.

Korean patent application No. 19908/1994, filed by the applicant of this invention, discloses a battery charging circuit for blocking the supply of the charge current in the case that the charge current or the charge voltage of the rechargeable battery exceeds a reference current or reference voltage, respectively. Accordingly, the circuit allows for the control of the pulse width and the amount of the charge current supplied to the battery.

It is well known that the full charge voltage of a rechargeable battery varies according to the surrounding temperature. That is, the full charge voltage decreases with increasing temperature. For example, a rechargeable battery may have a full charge voltage of 1.45V at a surrounding temperature of 25° C., while having a full charge voltage of 1.4V at a surrounding temperature of 50° C. Accordingly, it would be desirable and highly advantageous to have a battery charging circuit which can adaptively control the full charge voltage of a rechargeable battery according to variations of the surrounding temperature.

SUMMARY OF THE INVENTION

It is an object of the present invention to provide a battery charging circuit for adaptively controlling the full charge voltage of a rechargeable battery according to the surrounding temperature.

To achieve the above and other objects, the present invention provides a battery charging circuit that includes a power supply circuit for providing a rechargeable battery with a charge voltage. The circuit generates a reference voltage adaptive to the surrounding temperature, which is set corresponding to the full charge voltage of the rechargeable battery. The charge voltage of the rechargeable battery is compared with the reference voltage to generate a control signal. A switching device connects and disconnects the power supply circuit from the rechargeable battery in response to the control signal to adaptively control the full charge voltage according to variations of the surrounding temperature.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
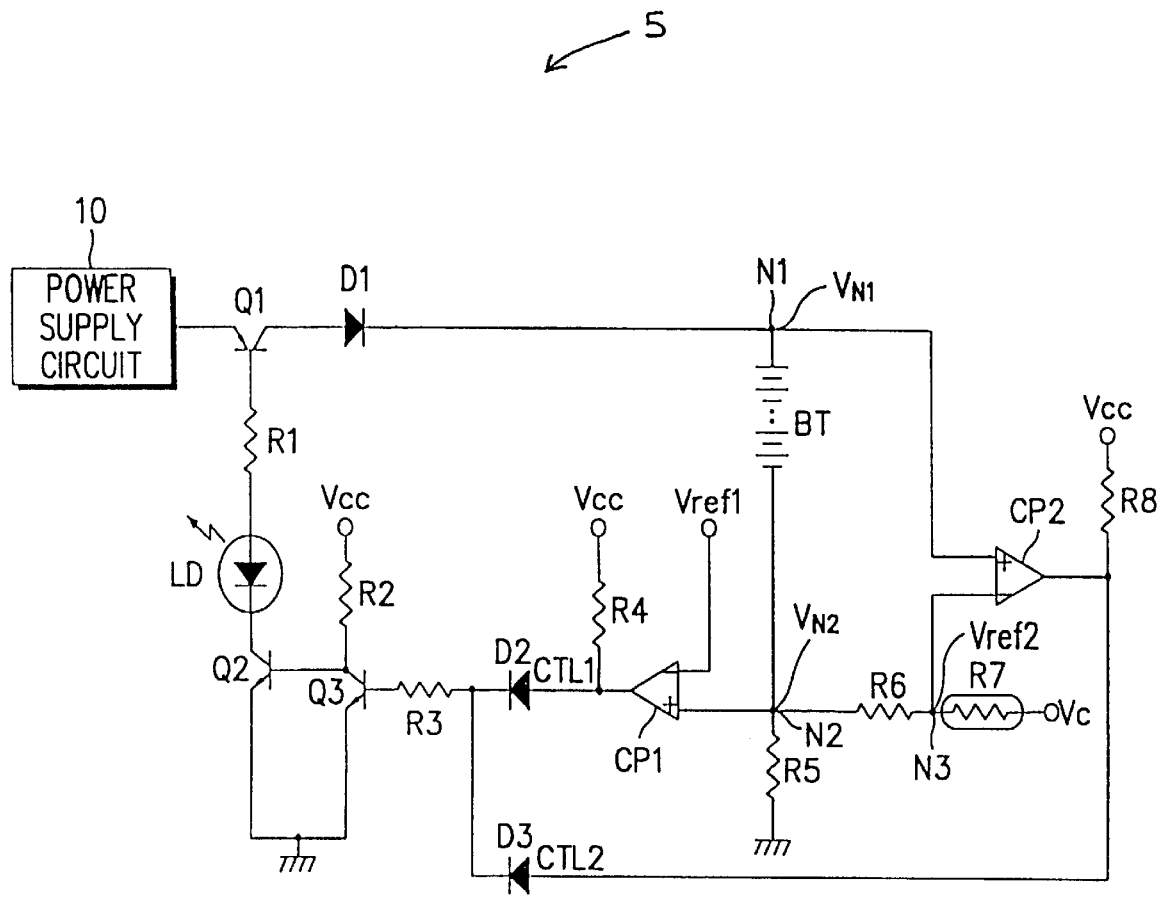
FIG. 1 is a schematic diagram of a battery charging circuit according to an embodiment of the present invention.

An embodiment of the present invention will be described in detail hereinbelow with reference to the accompanying drawings. It should be noted that like reference numerals designate like elements throughout the several views. In order to facilitate a comprehensive understanding, the present invention will be illustratively described with reference to a specific embodiment. In the following description, well-known functions or constructions which may obscure the present invention in unnecessary detail are not described in detail.

FIG. 1 illustrates a battery charging circuit 5 according to an embodiment of the present invention. A power supply circuit 10 provides a rechargeable battery BT, connected between node N1 and node N2, with a charge voltage via transistor Q1 and diode D1. A resistor R5 connected between node N2 and ground detects the load current of rechargeable battery BT. A comparator CP1 compares a voltage $V_{N2}$ at node N2 with a first reference voltage Vref1 to generate a first control signal CTL1. The voltage $V_{N2}$ corresponds to the charge current (load current) of the rechargeable battery BT. The first reference voltage Vref1 is set equal to voltage $V_{N2}$ during a charge mode of battery charging circuit 5. The first control signal CTL1 operates to prevent an over-current from flowing into rechargeable battery BT. A resistor R4, which is connected between a power supply terminal Vcc and the output of comparator CP1, pulls up the output voltage of comparator CP1.

A resistor R6 and a thermistor R7 constitute a means for generating a second reference voltage Vref2 which is set corresponding to the full charge voltage of rechargeable battery BT and is adaptive to the surrounding temperature. The resistor R6 is connected between node N2 and a node N3. The thermistor R7, which is connected between node N3 and a regulated voltage Vc, has a resistance which increases with increasing surrounding temperature. The second reference voltage Vref2, determined by resistor R6 and thermistor R7, is set higher than load voltage $V_{N2}$ at node N2. Here, second reference voltage Vref2 satisfies a charge voltage characteristic curve of rechargeable battery BT with respect to the surrounding temperature. That is, with an increase of the surrounding temperature, the resistance of thermistor R7 increases, resulting in a decrease of second reference voltage Vref2.

Further, a comparator CP2, having a non-inverting input connected to node N1 and an inverting input connected to node N3, compares the charge voltage of rechargeable battery BT with second reference voltage Vref2 to generate a second control signal CTL2. The second control signal CTL2 operates to control the pulse width of the charge current to rechargeable battery BT. A resistor R8, which is connected between the power supply terminal Vcc and the output of comparator CP2, pulls up the output voltage of comparator CP2. A PNP transistor Q1 functions as a first switching means and has an emitter connected to power supply circuit 10 and a collector connected to the anode of diode D1. The cathode of diode D1 is connected to node N1. The diode D1 prevents a countercurrent of the charge current. The anodes of diodes D2 and D3 are connected to first and second control signals CTL1 and CTL2, respectively. A resistor R3 is connected in common to the cathodes of diodes D2 and D3. It should be noted that diodes D2 and D3 constitute an OR gate for performing an OR function with respect to first and second control signals CTL1 and CTL2. NPN transistors Q2 and Q3 are connected in a Darlington configuration and function as a second switching means. The transistor Q3 has a collector connected to the power supply terminal Vcc via a resistor R2, an emitter connected to ground, and a base connected to the other end of resistor R3. A light emitting diode LD has a cathode connected to the collector of transistor Q2 and an anode connected to the base of transistor Q1 via a resistor R1. The transistor Q2 has a base connected to the collector of transistor Q3 and an emitter connected to ground. The three transistors Q1, Q2, and Q3 are switched according to the first and second control signals CTL1 and CTL2 to control the charge current supplied to rechargeable battery BT. The light emitting diode LD indicates the charging state of rechargeable battery BT.

Figure 2:
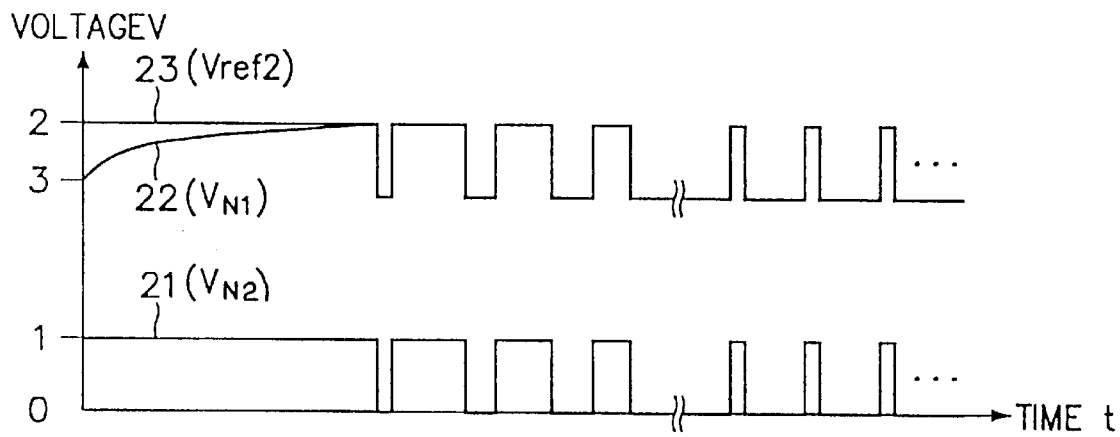
FIG. 2 is a graphical representation showing the charge voltage characteristics of the battery charging circuit of FIG. 1.
Figure 3:
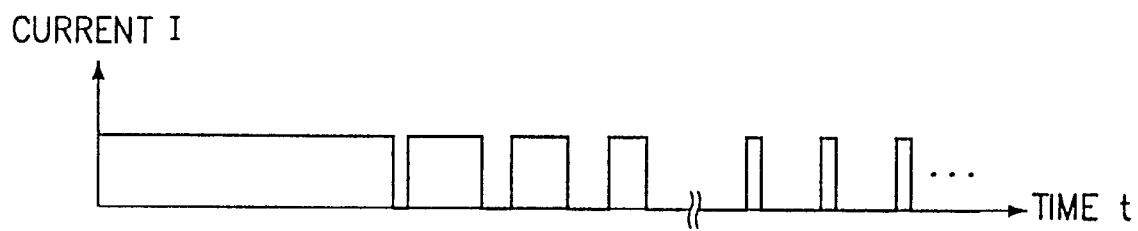
FIG. 3 is a graphical representation showing the charge current characteristics of the battery charging circuit of FIG. 1.

FIG. 2 illustrates the voltage characteristics of the battery charging circuit 5 with passing time. In FIG. 2, reference numeral 21 denotes the load voltage $V_{N2}$ at node N2, reference numeral 22 denotes the voltage $V_{N1}$ at node N1, and reference numeral 23 denotes the second reference voltage Vref2 at node N3. FIG. 3 illustrates the charge current characteristics of the battery charging circuit 5 with passing time.

Referring to FIGS. 1 through 3, operation of the battery charging circuit according to an embodiment of the present invention will be described in detail hereinbelow.

Upon power-up, power supply circuit 10 provides rechargeable battery BT with the charge voltage. At that moment, comparators CP1 and CP2 both have high impedance so that the charge current flows through diode D1, rechargeable battery BT, and load resistor R5. As power supply circuit 10 provides the charge voltage and current, voltage $V_{N2}$ increases abruptly, as shown in FIG. 2. Since first reference voltage Vref1 is set equal to voltage $V_{N2}$ during the charge mode of the circuit, comparator CP1 generates a logic "high" signal when voltage $V_{N2}$ is higher than first reference voltage Vref1 and a logic "low" signal when voltage $V_{N2}$ is lower than first reference signal Vref1. The logic signal output of comparator CP1 is first control signal CTL1 which controls the charge current supplied to rechargeable battery BT.

The average of the charge current flowing through load resistor R5 may be varied by controlling the resistance of load resistor R5 and first reference voltage Vref1. The first and second switching means, composed of the transistors Q1, Q2, and Q3, control the charge voltage $V_{N1}$ according to the first control signal CTL1 generated from comparator CP1. The comparator CP2 compares charge voltage $V_{N1}$ with second reference voltage Vref2 to generate a logic "high" signal when charge voltage $V_{N1}$ is higher than second reference voltage Vref2, and a logic "low" signal when charge voltage $V_{N1}$ is lower than second reference voltage Vref2. As mentioned above, the second reference voltage Vref2 is set corresponding to the full charge voltage of rechargeable battery BT. The logic signal output of comparator CP2 becomes the second control signal CTL2 for controlling the pulse width of the charge current supplied to rechargeable battery BT.

The OR gate composed of diodes D2 and D3 performs an OR function with respect to first and second control signals CTL1 and CTL2 and applies its output to the base of transistor Q3 via resistor R3. Thus, if either of first and second control signals CTL1 and CTL2 are a logic "high", transistor Q3 is turned on and then, transistors Q2 and Q1 are turned off. As a result, as shown in FIGS. 2 and 3, the path for the charge current is cut off. As time goes by, rechargeable battery BT is discharged naturally so that the voltage $V_{N2}$ become lower than the first reference voltage Vref1 and the charge voltage $V_{N1}$ becomes lower than the second reference voltage Vref2. Thus, comparators CP1 and CP2 generate a logic "low" level for both first and second control signals CTL1 and CTL2. Then, the OR gate consisting of diodes D2 and D3 generates a logic "low" level, thereby turning off transistor Q3. As a result, transistors Q2 and Q1 are turned on so that the path for the charge current is formed, thereby charging rechargeable battery BT, as shown in FIGS. 2 and 3. At that moment, light emitting diode LD is turned on, indicating that the battery charging circuit 5 is in charge mode.

In the meantime, if the surrounding temperature increases, the resistance of thermistor R7 increases, thereby decreasing second reference voltage Vref2. Therefore, the full charge voltage of the battery charging circuit 5 is lowered.

Connection and disconnection of the path for the charge current is repeated according to the charge voltage level of rechargeable battery BT so as to maintain the constant charge voltage. As shown in FIGS. 2 and 3, the pulse width of the charge current becomes narrower gradually and, with passing time, the charge and discharge operations are repeated at a regular period.

As apparent from the foregoing, the battery charging circuit according to the present invention varies the full charge reference voltage adaptively in response to variations of the surrounding temperature. Therefore, it is possible to adaptively change the full charge voltage of the rechargeable battery according to the surrounding temperature.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A battery charging circuit for charging a rechargeable battery in accordance with a current surrounding temperature, comprising:

a power supply circuit for providing the rechargeable battery with a charge voltage;

means for generating a control signal responsive to the charge voltage and a reference voltage, the reference voltage being set to a full charge voltage of the rechargeable battery and being adaptive with respect to the surrounding temperature and a terminal voltage of the rechargeable battery; and switching means for connecting and disconnecting said power supply circuit from the rechargeable battery in response to the control signal, so as to fully charge the rechargeable battery in accordance with the surrounding temperature.

2. The battery charging circuit of claim 1, further comprising a reference voltage generating means.

3. The battery charging circuit of claim 2, wherein said reference voltage generating means comprises:

a thermistor connected between a regulated voltage and an input of said control signal generating means; and a resistor connected between the input of said control signal generating means and a ground.

4. A battery charging circuit for charging a rechargeable battery in accordance with a current surrounding temperature, comprising:

a power supply circuit for providing the rechargeable battery with a charge voltage;

means for generating a reference voltage, the reference voltage being set to a full charge voltage of the rechargeable battery and being adaptive with respect to the surrounding temperature and a terminal voltage of the rechargeable battery;

means for comparing the charge voltage with the reference voltage to generate a control signal; and switching means for connecting and disconnecting said power supply circuit from the rechargeable battery in response to the control signal, wherein the battery charging circuit adaptively controls the full charge voltage in response to variations of the surrounding temperature.

5. The battery charging circuit of claim 4, wherein said reference voltage generating means comprises:

a thermistor connected between a regulated voltage and an input of said comparing means; and a resistor connected between the input of said comparing means and a ground.

6. The battery charging circuit of claim 4, wherein said comparing means is a comparator.

7. A battery charging circuit for a rechargeable battery, comprising:

a power supply circuit for providing the rechargeable battery with a charge voltage;

means for comparing a load voltage with a first reference voltage to generate a first control signal, said first reference voltage being set equal to the load voltage during a charge mode;

means for generating a second reference voltage adaptive to a surrounding temperature, said second reference voltage being set corresponding to a full charge voltage of the rechargeable battery;

means for comparing the charge voltage with the second reference voltage to generate a second control signal; and switching means for connecting and disconnecting said power supply circuit from the rechargeable battery in response to the first and second control signals, wherein the battery charging circuit adaptively controls the full charge voltage in response to variations of the surrounding temperature.

8. The battery charging circuit of claim 7, wherein said switching means comprises:

first switching means for generating a third control signal in response to one of the first and second control signals; and second switching means connected between said power supply circuit and the rechargeable battery for forming a current path therebetween in response to the third control signal from said first switching means.

9. The battery charging circuit of claim 8, further comprising a light emitting diode connected between said first and second switching means for indicating that the rechargeable battery is currently being charged.

10. The battery charging circuit of claim 8, wherein said first switching means comprises first and second transistors connected in a Darlington configuration.

11. The battery charging circuit of claim 7, wherein said second reference voltage generating means comprises:

a thermistor connected at one end to a regulated voltage; and a resistor connected between the other end of said thermistor and a ground.

* * * * *